US008284188B1

(12) United States Patent
Lauterbach et al.

(10) Patent No.: US 8,284,188 B1
(45) Date of Patent: *Oct. 9, 2012

(54) RAY TRACING SYSTEM, METHOD, AND COMPUTER PROGRAM PRODUCT FOR SIMULTANEOUSLY TRAVERSING A HIERARCHY OF RAYS AND A HIERARCHY OF OBJECTS

(75) Inventors: Christian Lauterbach, Carrboro, NC (US); David Patrick Luebke, San Jose, CA (US); Michael J. Garland, Lake Elmo, MN (US)

(73) Assignee: NVIDIA Corporation, Santa Clara, CA (US)

( * ) Notice: Subject to any disclaimer, the term of this patent is extended or adjusted under 35 U.S.C. 154(b) by 1011 days.

This patent is subject to a terminal disclaimer.

(21) Appl. No.: 11/927,099

(22) Filed: Oct. 29, 2007

(51) Int. Cl.
*G06T 15/00* (2011.01)

(52) U.S. Cl. ........................................................ 345/419
(58) Field of Classification Search ............... 345/419
See application file for complete search history.

(56) References Cited

U.S. PATENT DOCUMENTS

| | | | |
|---|---|---|---|
| 4,628,483 A | 12/1986 | Nelson | |
| 4,855,937 A | 8/1989 | Heartz | |
| 5,193,207 A | 3/1993 | Vander Vegt et al. | |
| 5,274,718 A | 12/1993 | Leonardi et al. | 382/240 |
| 5,594,844 A | 1/1997 | Sakai et al. | 345/427 |
| 5,621,908 A | 4/1997 | Akaboshi et al. | |
| 5,650,862 A | 7/1997 | Shimizu et al. | |
| 5,963,212 A | 10/1999 | Bakalash | |
| 6,065,005 A | 5/2000 | Gal et al. | |
| 6,489,955 B1 | 12/2002 | Newhall, Jr. | 345/419 |
| 6,518,971 B1 | 2/2003 | Pesto, Jr. et al. | |
| 6,556,200 B1 | 4/2003 | Pfister et al. | |
| 6,825,839 B2 | 11/2004 | Huang et al. | |
| 6,879,980 B1 | 4/2005 | Kothuri et al. | |
| 7,146,486 B1 | 12/2006 | Prokopenko et al. | 712/22 |
| 7,194,125 B2 | 3/2007 | Vlasic et al. | 382/154 |
| 7,348,975 B2 | 3/2008 | Reshetov et al. | 345/421 |
| 7,580,927 B1 | 8/2009 | Abugov et al. | |
| 7,616,782 B2 | 11/2009 | Badawy | |
| 7,903,125 B1 | 3/2011 | Ayers et al. | |
| 8,065,288 B1 | 11/2011 | Garland et al. | |
| 8,243,083 B1 | 8/2012 | Garland et al. | |
| 8,264,484 | 9/2012 | Lauterbach et al. | |
| 2003/0028509 A1 | 2/2003 | Sah et al. | |
| 2004/0210596 A1 | 10/2004 | Budd et al. | |

(Continued)

FOREIGN PATENT DOCUMENTS

WO    2007082042 A2    7/2007

(Continued)

OTHER PUBLICATIONS

Arvo, James, and David Kirk. "Fast Ray Tracing by Ray Classification." ACM SIGGRAPH Computer Graphics 21.4 (1987): 55-64.*

(Continued)

*Primary Examiner* — Xiao M. Wu
*Assistant Examiner* — Scott E Sonners
(74) *Attorney, Agent, or Firm* — Zilka-Kotab, PC

(57) ABSTRACT

A ray tracing system, method, and computer program product are provided for simultaneously traversing a hierarchy of rays and a hierarchy of objects. In operation, a hierarchy of rays and a hierarchy of objects are simultaneously traversed. Additionally, ray tracing is performed, based on the traversal.

26 Claims, 5 Drawing Sheets

U.S. PATENT DOCUMENTS

| | | |
|---|---|---|
| 2005/0001844 A1 | 1/2005 | Naegle |
| 2005/0177564 A1 | 8/2005 | Kobayashi et al. |
| 2007/0159488 A1 | 7/2007 | Danskin et al. |
| 2007/0165035 A1 | 7/2007 | Duluk, Jr. et al. |
| 2007/0169042 A1 | 7/2007 | Janczewski |
| 2007/0182732 A1* | 8/2007 | Woop et al. .................. 345/420 |
| 2007/0260663 A1 | 11/2007 | Frigo et al. |
| 2007/0264023 A1 | 11/2007 | Gorrell et al. |
| 2008/0043018 A1 | 2/2008 | Keller et al. |
| 2008/0316214 A1 | 12/2008 | Peeper |
| 2009/0089542 A1 | 4/2009 | Laine et al. |
| 2009/0132878 A1 | 5/2009 | Garland et al. |
| 2010/0076941 A1 | 3/2010 | Dotsenko et al. |

FOREIGN PATENT DOCUMENTS

| | | |
|---|---|---|
| WO | 2008127610 A2 | 10/2008 |
| WO | 2008127622 A2 | 10/2008 |
| WO | 2008127623 A2 | 10/2008 |

OTHER PUBLICATIONS

Reshetov, Alexander, Alexei Soupikov, and Jim Hurley. "Multi-Level Ray Tracing Algorithm." ACM Transactions on Graphics (TOG)—Proceedings of ACM SIGGRAPH 2005 24.3 (Jul. 2005): 1176-1185.*

Office Action Summary from U.S. Appl. No. 11/938,091 mailed on Mar. 2, 2010.

Wald et al., SIMD Ray Steam Tracing—SIMD Ray Traversal with Generalized Ray Packets and On-the-fly Re-Ordering, Aug. 2, 2007, SCI Institute Technical Report, UUSCI-2007-012, pp. 1-8.

Wald et al., Interactive rendering with Coherent Ray Tracing, 2001, Blackwell Publishers, vol. 20, 153-164.

Office Action Summary from U.S. Appl. No. 11/940,782 mailed on May 20, 2010.

Hillis et al.; Data Parallel Algorithms; Dec. 1986; Communications of the ACM.

U.S. Appl. No. 11/874,093, filed Oct. 17, 2007.

Gottschalk et al., "OBBTree: A Hierarchical Structure for Rapid Interference Detection," Proc. SIGGRAPH '96.

Roger et al., "Whitted Ray-Tracing for Dynamic Scenes using a Ray-Space Hierarchy on the GPU," Proc. Eurographics Symposium on Rendering, 2007.

Wald, "On fast Construction of SAH-based Bounding Volume Hierarchies," Proc. IEEE/EG Symposium on Interactive Ray Tracing '07.

Advisory Action from U.S. Appl. No. 11/950,193, dated Oct. 3, 2011.

Non-Final Office Action from U.S. Appl. No. 12/333,255, dated Oct. 11, 2011.

Blelloch, G. E., Prefix Sums and Their Applications, CMU-CS-90-190, Nov. 1990, USA (25 pages).

Blelloch, G. E., Vector Models for Data-Parallel Computing, The MIT Press, 1990, USA and England (264 pages).

Gunther, J. et al., Realtime Ray Tracing on GPU with BVH-based Packet Traversal, To appear in the IEEE/Eurographics Symposium on Interactive Ray Tracing 2007, IEEE Computer Society, 2007, Washington D.C., pp. 113-118 (6 pages).

Harris, M., Parallel Prefix Sum (Scan) with CUDA, nVIDIA Corporation, Apr. 2007 (21 pages).

Havran, V. et al., Efficient Sorting and Searching in Rendering Algorithms, Eurographics 2006 Tutorial T4, The Eurographics Association, Version 1.1, Aug. 31, 2006, Prague (74 pages).

Havran, V., Heuristic Ray Shooting Algorithms, Dissertation Thesis, Nov. 2000, Prague (220 pages).

Horn, D. R. et al., Interactive k-D Tree GPU Raytracing, Proceedings of the 2007 symposium on Interactive 3D graphics and games, ACM, 2007, USA, pp. 167-174 (8 pages).

Kamel, I. et al, On packing R-trees, Proceedings of the second international conference on Information and knowledge management, ACM, 1993, New York, pp. 490-499 (21 pages).

Naishlos, D. et al., Towards a First Vertical Prototyping of an Extremely Fine-grained Parallel Programming Approach, Proceedings of the thirteenth annual ACM symposium on Parallel algorithms and architectures, ACM, 2001, New York, NY, USA (19 pages).

Pascucci, V. et al., Global Static Indexing for Real-time Exploration of Very Large Regular Grids, Proceedings of the 2001 ACM/IEEE conference on Supercomputing (CDROM), ACM, Nov. 2001, New York (8 pages).

Popov, S. et al. Stackless KD-Tree Traversal for High Performance GPU Ray Tracing, EUROGRAPHICS 2007, Eurographics Association and Blackwell Publishing, vol. 26, No. 3, Oct. 12, 2007, UK and USA, pp. 415-424 (10 pages).

Sato, K. et al. Implementing the PRAM Algorithms in the Multithread Architecture and Evaluating the Performance, Information Processing Society of Japan, Mar. 20, 1998, Japan, pp. 39-46 (8 pages) (English Abstract only).

Sengupta, S. et al., Scan Primitives for GPU Computing, Graphics Hardware (2007), ACM, Eurographics Association, Aug. 4-5, 2007, Aire-la-Ville, Switzerland, pp. 97-106 (11 pages).

Thinking Machines Corporation, Connection Machine Model CM-2 Technical Summary, Version 6.0, Nov. 1990, USA (118 pages).

Wachter, C. et al., Instant Ray Tracing: The Bounding Interval Hierarchy, Eurographics Symposium on Rendering (2006), The Eurographics Association, 2006, Germany, pp. 139-149 (11 pages).

Wald, I. Realtime Ray Tracing and Interactive Global Illumination, Dissertation Thesis, Jan. 21, 2004, Germany (311 pages).

Yoon, S. E. et al., Cache-Oblivious Mesh Layouts, ACM Transaction on Graphics, SIGGRAPH 2005, Apr. 28, 2005, USA (10 pages).

Zagha, M. et al., Radix Sort For Vector Multiprocessors, Proceedings of the 1991 ACM/IEEE Conference on Supercomputing, Nov. 1991, pp. 712-721, New York, NY, USA (10 pages).

Translation of Office Action from German Application No. 10-2008-031-998.8 dated Mar. 9, 2010 (3 pages).

Notice of Preliminary Rejection from Korean Patent Application No. 10-2008-0113250, dated May 28, 2010 (6 pages).

Notice of Preliminary Rejection from Korean Patent Application No. 10-2008-0094936, dated Feb. 26, 2010 (5 pages).

Advisory Action from U.S. Appl. No. 11/862,938, dated Aug. 23, 2010 (4 pages).

Non-Final Office Action from U.S. Appl. No. 11/927,159, dated Sep. 17, 2010 (18 pages).

Non-Final Office Action from U.S. Appl. No. 11/942,608, dated Dec. 18, 2009 (15 pages).

Non-Final Office Action from U.S. Appl. No. 11/862,938, dated Dec. 1, 2009 (14 pages).

Final Office Action from U.S. Appl. No. 11/938,091, dated Oct. 14, 2010 (21 pages).

Final Office Action from U.S. Appl. No. 11/940,782, dated Sep. 16, 2010 (12 pages).

Final Office Action from U.S. Appl. No. 11/942,608, dated May 10, 2010 (17 pages).

Non-Final Office Action from U.S. Appl. No. 11/942,608, dated Nov. 4, 2010 (18 pages).

Non-Final Office Action from U.S. Appl. No. 11/950,193, dated Feb. 3, 2011 (18 pages).

U.S. Appl. No. 11/938,091, filed Nov. 9, 2007.

U.S. Appl. No. 11/942,608, filed Nov. 19, 2007.

U.S. Appl. No. 11/862,938, filed Sep. 27, 2007.

U.S. Appl. No. 11/940,782, filed Sep. 27, 2007.

U.S. Appl. No. 11/927,159, filed Oct. 29, 2007.

Blelloch, G. E., "Programming Parallel Algorithms," Communications of the ACM, Mar. 1996, vol. 39, No. 3, pp. 85-97.

Blelloch, G. E. et al., "Implementation of a Portable Nested Data-Parallel Language," Journal of Parallel and Distributed Computing, Apr. 1994, 21(1), pp. 4-14.

Chatterjee, S. et al., "Scan Primitives for Vector Computers," Proceedings of Supercomputing '90, Nov. 12-16, 1990, pp. 666-675.

Dotsenko, Y. et al., "Fast Scan Algorithms on Graphics Processors," International Conference on Supercomputing, Jun. 7-12, 2008, pp. 205-213.

Gibbons, P. B., "A More Practical PRAM Model," ACM Symposium on Parallel Algorithms and Architectures—SPAA, 1989, pp. 158-168.

Hensley, J. et al., "Fast Summed-Area Table Generation and its Applications," EUROGRAPHICS 2005, vol. 24, No. 3, pp. 1-9.

Horn, D., "Stream Reduction Operations for GPGPU Applications," GPU Gems 2: Programming Techniques for High-Performance Graphics and General-Purpose Computation, Chapter 36, Second Printing, Apr. 2005, retrieved from http://http.developer.nvidia.com/GPUGems2/gpugems2_chapter36.html on Jul. 12, 2011, pp. 1-11.

Iverson, K. E., "A Programming Language," John Wiley & Sons, Fourth Printing, May 1967, pp. vii-xxi and 1-286.

Lindholm, E. et al., "NVIDIA Tesla: A Unified Graphics and Computing Architecture," IEEE Micro, Mar.-Apr. 2008, pp. 39-55.

Nickolls, J. et al., "Scalable Parallel Programming with CUDA," ACM Queue, Mar.-Apr. 2008, pp. 42-53.

NVIDIA Corporation, "NVIDIA CUDA Programming Guide," Nov. 29, 2007, Version 1.1, pp. ii-xiii and 1-128.

Schwartz, J. T., "Ultracomputers," ACM Transactions on Programming Languages and Systems, Oct. 1980, vol. 2, No. 4, pp. 484-521.

Sengupta, S. et al., "A Work-Efficient Prefix-Sum Algorithm," Proceedings of the Workshop on Edge Computing Using New Commodity Architectures, 2006, pp. 1-2.

Sengupta, S. et al., "Data-Parallel GPU Computing," May 31, 2008, pp. 1-28.

Stratton, J. A. et al., "MCUDA: An Efficient Implementation of CUDA Kernals on Multi-Cores," IMPACT Technical Report, IMPACT-08-01, Mar. 12, 2008, pp. 1-18.

Notice of Allowance from U.S. Appl. No. 11/938,091 dated Aug. 24, 2011.

Advisory Action from U.S. Appl. No. 11/942,608 dated Jul. 18, 2011.

Advisory Action from U.S. Appl. No. 11/950,245 dated Aug. 16, 2011.

Final Office Action from U.S. Appl. No. 11/927,159 dated May 26, 2011.

Final Office Action from U.S. Appl. No. 11/950,193 dated Jul. 22, 2011.

Final Office Action from U.S. Appl. No. 11/950,245 dated May 25, 2011.

Non-Final Office Action from U.S. Appl. No. 11/950,245 dated Oct. 5, 2010.

Examiner's Answer from U.S. Appl. No. 11/862,938 dated Aug. 17, 2011.

Final Office Action from U.S. Appl. No. 11/942,608 dated Apr. 29, 2011.

Garland, M. J. et al., U.S. Appl. No. 11/950,193, filed Dec. 4, 2007.

Garland, M. J. et al., U.S. Appl. No. 12/333,244, filed Dec. 11, 2008.

Sengupta, S. et al., U.S. Appl. No. 12/333,255, filed Dec. 11, 2008.

Sengupta, S. et al., U.S. Appl. No. 11/950,245, filed Dec. 4, 2007.

Notice of Allowance from U.S. Appl. No. 12/333,255, dated Apr. 11, 2012.

Notice of Allowance from U.S. Appl. No. 11/927,159, dated May 10, 2012.

Non-Final Office Action from U.S. Appl. No. 12/333,244, dated Jun. 1, 2012.

Notice of Allowance from U.S. Appl. No. 12/333,244, dated Aug. 23, 2012.

* cited by examiner

RAY TRACING SYSTEM, METHOD, AND COMPUTER PROGRAM PRODUCT FOR SIMULTANEOUSLY TRAVERSING A HIERARCHY OF RAYS AND A HIERARCHY OF OBJECTS

FIELD OF THE INVENTION

The present invention relates to ray tracing, and more particularly to organizing rays in conjunction with ray tracing.

BACKGROUND

Ray tracing involves a technique for determining a visibility of an object or objects from a given point, such as but not limited to an "eye" or "camera" point, by following a ray. Current interactive ray tracing implementations are based on the assumption that a complete scene description, including all geometric objects, is known and stored in memory, such that a complete acceleration structure (e.g. a data tree structure hierarchy) may be built as a pre-processing operation. This complete acceleration structure is subsequently used for accelerating ray tracing queries.

For static scenes, the acceleration structure is often built once for a first frame and re-used for all further frames. For dynamic scenes, the acceleration structure either has to be fully rebuilt per frame or, if possible, updated to account for changes. The basic presumption of current interactive applications using rasterization on graphic processing units (GPUs) is that all scene geometry exists in some global location.

Such presumption is not necessarily always correct. For example, vertex programs may be used to perform animation, and therefore, the actual position of vertices may not necessarily be known until after transformation. Furthermore, future applications may utilize geometry shaders to create geometry during rendering (e.g. for displacement mapping). In this case, not even a number of primitives may be known before rendering. Thus, the traditional approach to ray tracing is not necessarily a good fit to current or future rendering paradigms. There is thus a need for addressing these and/or other issues associated with the prior art.

SUMMARY

A ray tracing system, method, and computer program product are provided for simultaneously traversing a hierarchy of rays and a hierarchy of objects. In operation, a hierarchy of rays and a hierarchy of objects are simultaneously traversed. Additionally, ray tracing is performed, based on the traversal.

DETAILED DESCRIPTION

Figure 1:
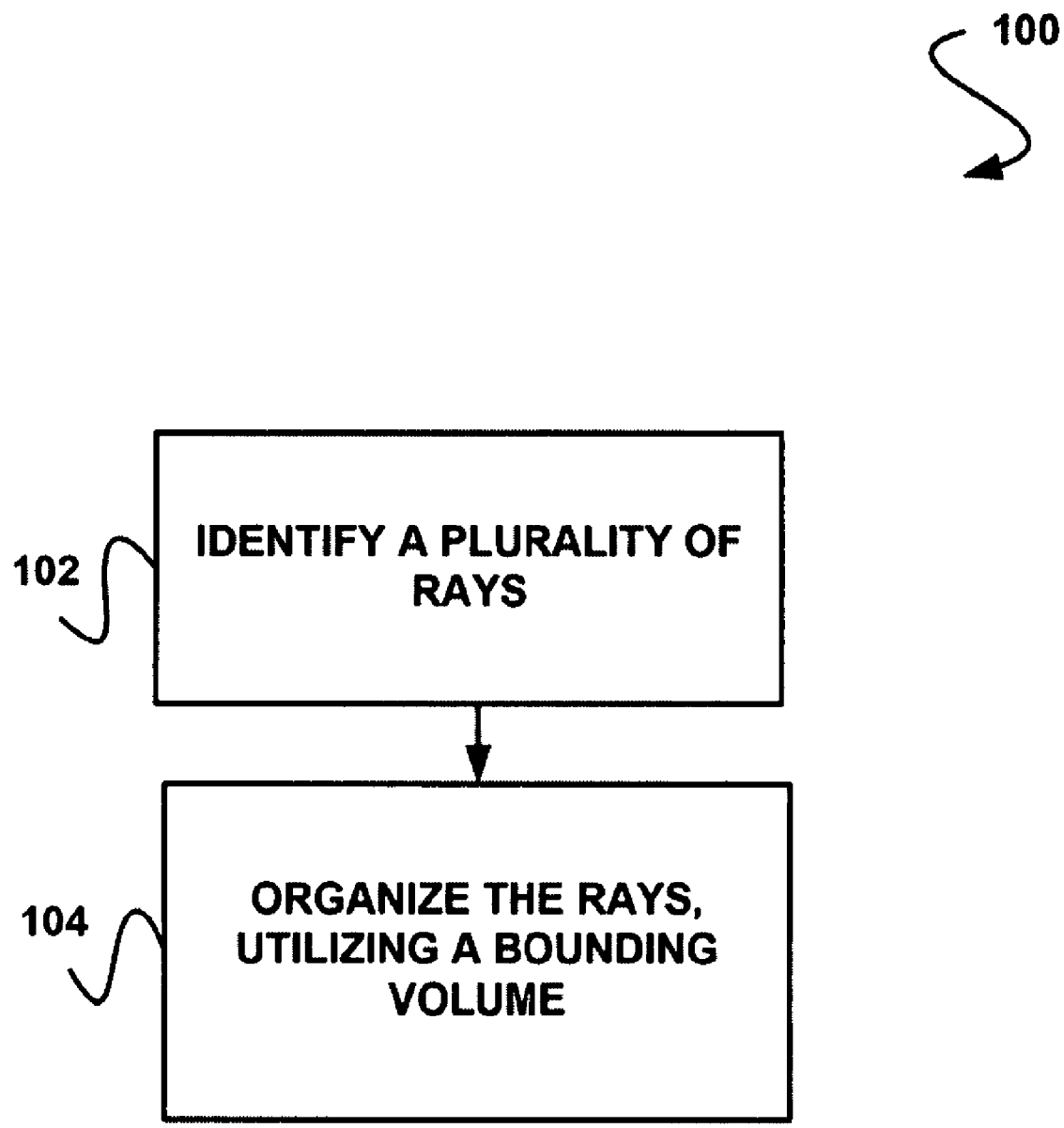
FIG. 1 shows a method for organizing a plurality of rays utilizing a bounding volume, in accordance with one embodiment.

FIG. 1 shows a method 100 for organizing a plurality of rays utilizing a bounding volume, in accordance with one embodiment. As shown, a plurality of rays are identified. See operation 102. Additionally, the rays are organized utilizing a bounding volume. See operation 104. As an option, ray tracing may, in one embodiment, be performed utilizing the organized rays. Of course, however, any other desired use of the organized rays is contemplated, in other embodiments.

In the context of the present description, a bounding volume refers to any volume which may contain at least one object (e.g. at least one ray, at least one primitive, etc.). For example, in various embodiments, the bounding volume may include, but is not limited to a bounding box, a bounding sphere, a bounding cone, a bounding cylinder, and/or any other bounding volume that meets the above definition.

In various embodiments, the bounding volume may include a convex or concave bounding volume. In one embodiment, the bounding volume may be an oriented bounding volume [e.g. an oriented bounding box (OBB), etc.]. As an option, the bounding volume may even be an axis-aligned bounding volume [e.g. an axis-aligned bounding box (AABB), etc.].

Additionally, in one embodiment, the rays may be organized utilizing a data tree. As an option, the rays may be organized utilizing a tree of the bounding volumes [i.e. a bounding volume hierarchy (BVH)]. In one embodiment, the hierarchy of rays may be generated as a result of the organization of the rays in operation 104.

In the context of the present description, a bounding volume hierarchy refers to a tree of bounding volumes. At a bottom of the hierarchy, a size of a bounding volume may be determined by a threshold. In such case, the threshold may be configured such that the bounding volume encompasses an object, or group of objects. At a point in the hierarchy not at the bottom (i.e. an internal node), the bounding volume may encompass a larger set of objects (e.g. a group of rays, objects, other bounding volumes, etc.). More information will be described hereinafter regarding various different embodiments in which the above bounding volume organization may or may not be used.

Figure 2:
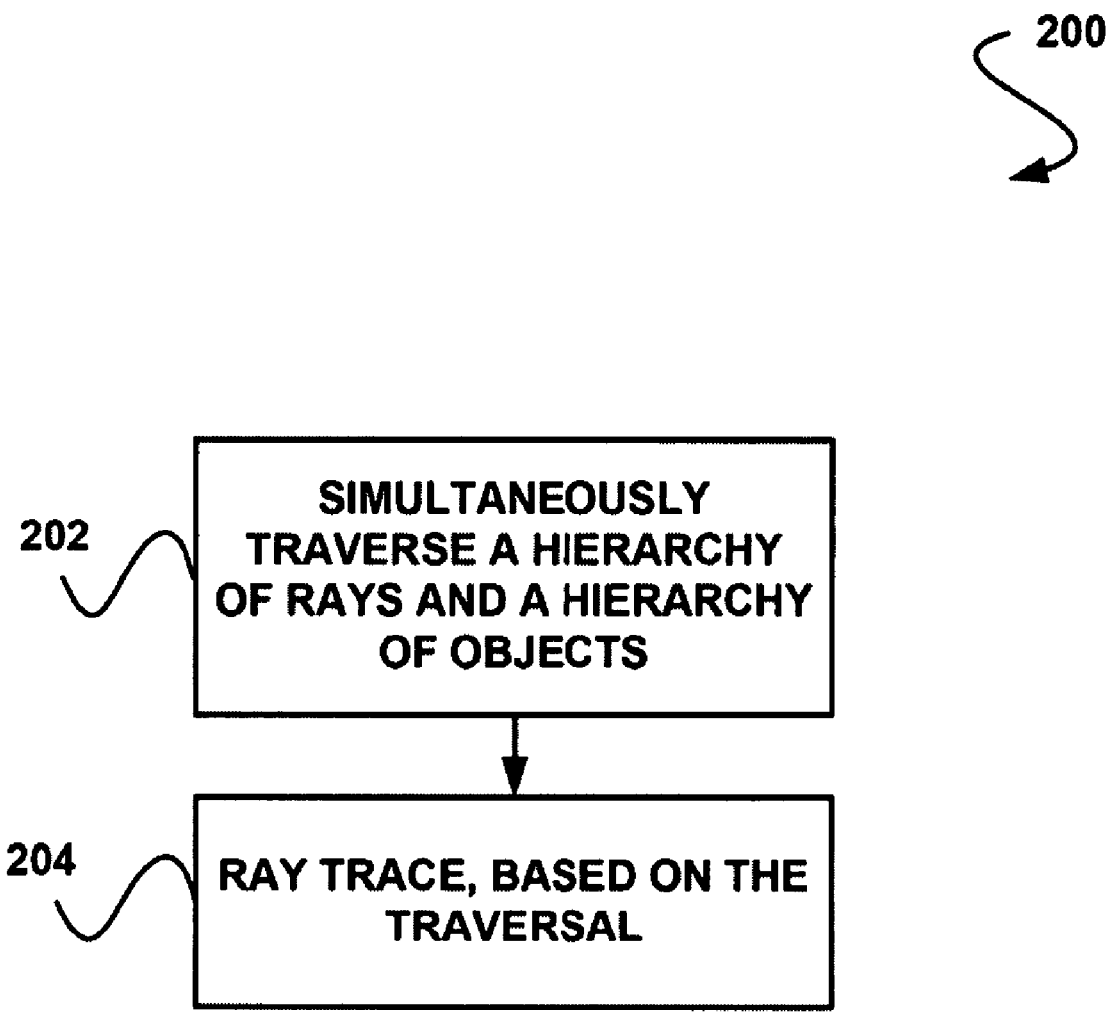
FIG. 2 shows a ray tracing method for simultaneously traversing a hierarchy of rays and a hierarchy of objects, in accordance with one embodiment.

FIG. 2 shows a ray tracing method 200 for simultaneously traversing a hierarchy of rays and a hierarchy of objects, in accordance with one embodiment. As an option, the present method 200 may be implemented in the context of the method of FIG. 1. For example, the instant method 200 may leverage the organization of FIG. 1. Of course, however, the method 200 may be carried out in any desired environment. It should also be noted that the aforementioned definitions may apply during the present description.

As shown, a hierarchy of rays and a hierarchy of objects are simultaneously traversed. See operation 202. In the context of the present description, an object refers to any object (e.g. primitive, etc.) included in a scene or data set. In various embodiments, the objects may include primitives including but not limited to points, lines or line segments, planes, circles, spheres, triangles or other polygons, spheres, cubes, toroids, pyramids, and/or any other shape, for that matter. In the context of the present description, a node of a hierarchy refers to any data element in the hierarchy. In various embodiments, the node may be an internal node (i.e. a node with an associated child node), or a leaf node (i.e. a node with no associated child nodes).

Still yet, in the context of the present description, traversing refers to any technique of processing one or more nodes in a hierarchy (e.g. a tree data structure, etc.). For example, in various embodiments, traversing may include, but is not limited to in-order traversal, preorder traversal, post-order traversal, functional traversal, iterative traversal, and/or any other process that meets the above definition.

In one embodiment, the hierarchy of rays may include a plurality of rays to be evaluated. As an option, the hierarchy of rays may be generated for each of a plurality of frames. In the context of the present description, a frame refers to any image. In various embodiments, such image may be an isolated image or an image in a sequence of images. Furthermore, in one embodiment, the hierarchy of objects may include a subset of objects that are intersected by at least one of the rays.

In one embodiment, the hierarchy of rays may be generated by organizing a plurality of rays. For example, the rays may be organized utilizing a bounding volume. See the description of FIG. 1, for instance.

In one embodiment, at least one aspect of the bounding volume may be minimized, for reasons that will later become apparent. For example, a surface area and/or a volume of the bounding volume may be minimized. Such minimization may be directly related to an orientation of rays. It should be noted that the hierarchy of rays is not limited to a tree of bounding volumes, as any desired type of hierarchy may be utilized.

As shown further, ray tracing is performed, based on the traversal. See operation 204. In one embodiment, the ray tracing may be performed utilizing a parallel processor architecture including a plurality of processors.

In the context of the present description, the parallel processor architecture may include any architecture that includes two or more processors that operate in parallel. In one embodiment, such parallel processor architecture may take the form of a graphics processor [e.g. graphics processing unit (GPU), etc.], or any other integrated circuit equipped with graphics processing capabilities (e.g. in the form of a chipset, system-on-chip (SOC), core integrated with a CPU, discrete processor, etc.). In still another embodiment, the foregoing parallel processing architecture may include a cell processor.

By this design, a streaming model for feeding a ray tracer may be provided, while still maintaining ray tracing performance and parallelism on the parallel processor architecture. In one embodiment, traversing the hierarchies may intersect both hierarchies in parallel, which the parallel processor architecture may perform with a work-queue approach, as will soon become apparent.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
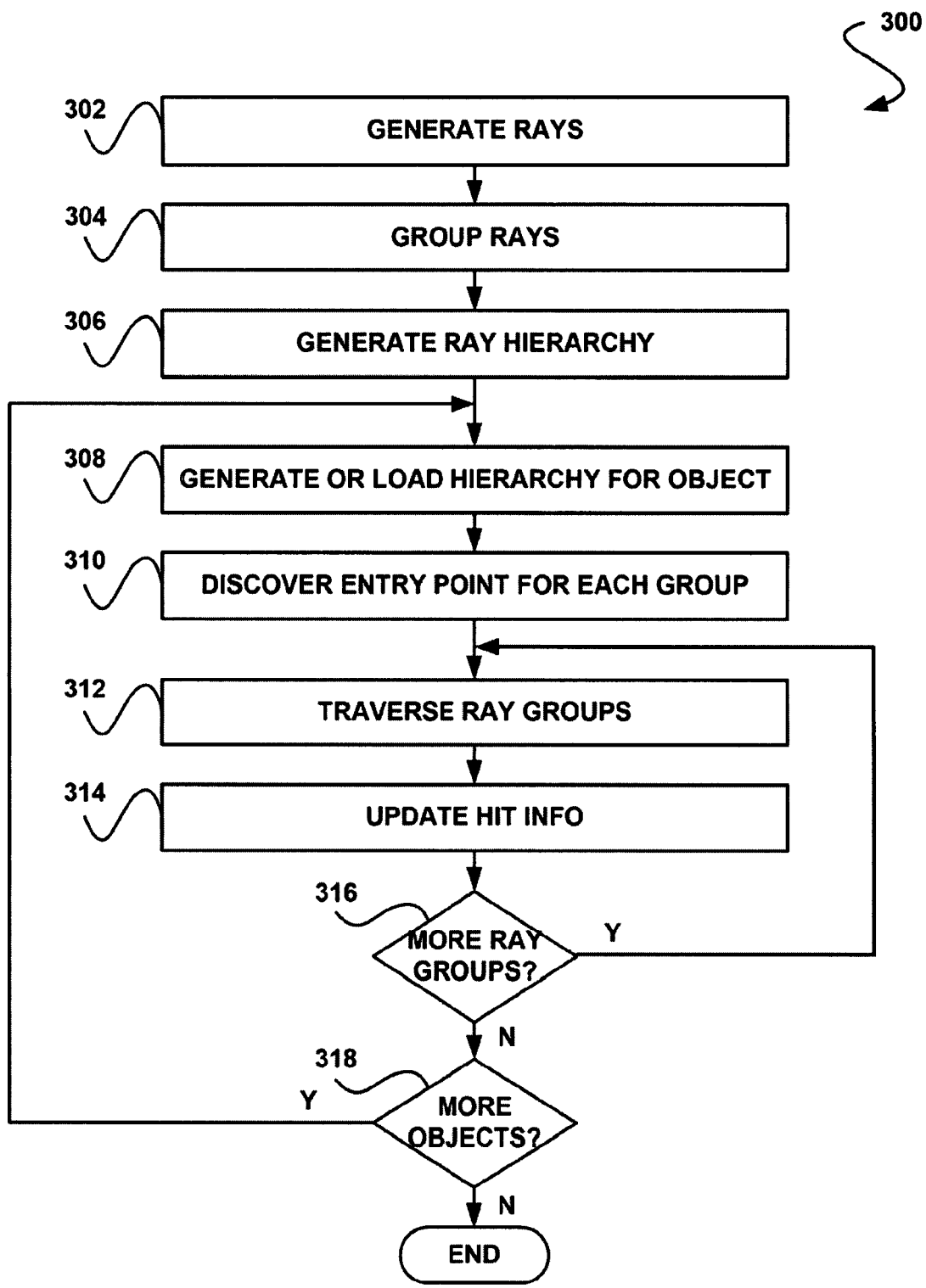
FIG. 3 shows a ray tracing method for simultaneously traversing a hierarchy of rays and a hierarchy of objects, in accordance with another embodiment.

FIG. 3 shows a ray tracing method 300 for simultaneously traversing a hierarchy of rays and a hierarchy of objects, in accordance with another embodiment. As an option, the present method 300 may be implemented in the context of the functionality of FIGS. 1-2. Of course, however, the method 300 may be carried out in any desired environment. It should also be noted that the aforementioned definitions may apply during the present description.

As shown, rays that are to be traced are generated for a frame. See operation 302. For example, the rays may be generated by shaders associated with a rasterization process. Additionally, the rays may remain constant for the frame.

Once the rays are generated, the rays are grouped. See operation 304. The rays may, in one embodiment, be grouped utilizing a bounding volume. In one embodiment, the bounding volume may include an OBB.

In various other embodiments, other bounding volumes may be utilized. For example, frustum and bounding cone representations may be utilized to bound groups of rays. In this case, rays with a common origin may be bound more compactly, utilizing minimal memory. It should be noted that incoherent directions of the rays may influence which bounding volumes provide a better, more dependable fit.

In one embodiment, determining the OBB for a group of rays may be accomplished using a principal component analysis (PCA) to determine a dominant three vectors for all ray directions. This may involve solving a 3×3 eigensystem. Using eigenvectors resulting from solving the eigensystem as a basis, the extents of the OBB may be computed and saved.

In another embodiment, determining the OBB for a group of rays may be accomplished by finding an average ray direction of all rays in the group and selecting any two other orthogonal vectors to form a basis. Similarly, merging two OBBs, or calculating the extents for two OBBs, may be accomplished using a principal component analysis to determine a dominant three vectors for all of the ray directions. Additionally, merging two OBBs may be accomplished by finding an average ray direction for all rays in the groups and selecting any two other orthogonal vectors to form a basis. In one embodiment, the basis vectors of two OBBs may be averaged and used to generate the extents for a combined OBB.

Once the rays are grouped, a ray hierarchy is generated. See operation 306. In one embodiment, the ray hierarchy may be built using a top-down data structure algorithm such as a BVH data structure algorithm. In this case, each group of rays may be split into two additional groups of rays.

The two additional groups of rays may each be split into two more groups of rays. This process may continue until certain termination criteria is met. For example, the termination criteria may put a threshold on the number of rays per node (e.g. one block or group of rays per node, etc.).

In one embodiment, the groups of rays may be split based on a central point of the group (e.g. a spatial median of the group). In another embodiment, a ratio of a bounding volume surface area-to-surface area of rays in the bounding volume may be minimized to determine the split. In various other embodiments, the rays may be split based on criteria including any combination of an area, a volume, and/or a spatial median.

In another embodiment, each group of rays may be split by a different processor. For example, ray tracing may be performed utilizing a parallel processor architecture including a plurality of processors. In this case, each of the processors of the parallel processor architecture may split the corresponding group of rays.

Further information and details regarding a possible implementation of the BVH data structure for use in a parallel processing architecture may be found with reference to a co-pending U.S. patent application entitled "SYSTEM, METHOD, AND COMPUTER PROGRAM PRODUCT FOR GENERATING A RAY TRACING DATA STRUCTURE UTILIZING A PARALLEL PROCESSOR ARCHI- TECTURE," which was filed Oct. 17, 2007 under application Ser. No. 11/874,093 and names common inventors, and which is incorporated herein by reference in its entirety.

Next, a hierarchy is generated or loaded for an object in a scene. See operation 308. For example, a BVH may be constructed for an object (e.g. group of primitives, etc.) in the scene.

For static objects, the hierarchy may be computed once and subsequently loaded from memory. It should be noted that the object hierarchy may be relatively coarse. For example, a bounding volume containing a number of primitives greater than one may be utilized for the lowest nodes of in the object BVH.

In one embodiment, the hierarchy for the objects may be generated using a parallel processor architecture. Note again the abovementioned patent application entitled "SYSTEM, METHOD, AND COMPUTER PROGRAM PRODUCT FOR GENERATING A RAY TRACING DATA STRUCTURE UTILIZING A PARALLEL PROCESSOR ARCHITECTURE," which is incorporated herein by reference in its entirety.

Once the hierarchy is generated or loaded for every object in a scene, entry points are discovered for each ray group by intersecting each ray hierarchy and each object hierarchy. See operation 310. For example, if there is no intersection of an OBB of a ray group with child nodes of a split object, or node, the rays are not processed further.

If the OBB intersects one child node of a split object, one level of the object BVH may be descended. If two children of a parent node are intersected, one level in the ray hierarchy may be descended. This may be repeated until entry points for each ray groups are discovered. In the context of the present description, an entry point refers to the first node encountered in a top-down traversal of the object hierarchy for which both child nodes bounding volumes intersect the OBB of the ray group.

Once the entry points are found for each ray group, the rays comprising the ray group are traversed through the object hierarchy from the entry points. See operation 312. Traversing through the object hierarchy allows intersection of the rays with a current object hierarchy.

This may be used to determine which ray groups in a hierarchy intersect which objects in a hierarchy. Pairs of ray node/object node pairs may also be tracked during the traversal process. For example, as the rays comprising a ray group are traversed through the object hierarchy, results of the traversal may be stored.

Based on the traversal, rays which will not hit the object are not processed further. In this case, a number of potential nodes where an intersection may occur may thus be limited. It should be noted that, if objects sent as part of a rendering process are localized, it may be expected that only a small subset of rays will intersect any object.

Groups of rays that may intersect an object may be determined expediently. For example, an optimal entry point (i.e. node) in the object hierarchy for any group of rays may be determined. Given the entry point, each group of rays may be processed independently. Thus, standard ray tracing may be implemented for all rays in the group starting from the optimal entry point, which may be an inner node or a leaf node in the object hierarchy.

In one embodiment, the optimal entry point may be determined utilizing a parallel entry point search algorithm that intersects the ray group and the object hierarchies. A root node (R) of the ray group hierarchy and a root node (B) of the object hierarchy may be used as inputs. A list of ray groups, or ray group nodes, may then be output with a corresponding object hierarchy node which is the entry point of the ray group.

To ensure that enough parallelism is available for running a number of such parallel entry point search algorithms (b) in parallel, b entry points ($e_i$) may be found in the ray hierarchy by traversing a first log(b) levels of the hierarchy and then assigning each of the ray groups the node pair ($B,e_i$) as a starting point. As an option, the node pair may be written to a work queue.

In one embodiment, a parallel processor architecture may be utilized. As an option, each of a plurality of processors may maintain a local work queue of node pairs in memory representing potential OBB-object bounding volumes intersections to be performed. In one embodiment, each thread of a processor may read a pair from the local work queue and load the respective nodes from memory. The thread may then load the children of the object BVH node and test them for intersection with the ray group OBB.

In various situations, the ray OBB may intersect zero, one, or both child boxes. If there is no intersection, nothing is written back to the work queue in order to eliminate further processing of the rays. If there are two intersections, then the current object BVH node is determined to be the best entry point. In this case, if the current ray node is a leaf, then the node pair may be written back to an output entry point list, or work queue. Further explanation regarding oriented bounding box intersection of objects is set forth below with respect to FIG. 4.

If the current ray node is an inner node (i.e. a parent node), two children of the ray node may be added into the work queue as pairs with the current entry point. If there is one intersection, the pair formed by the current ray node and intersecting object BVH node may be written back for further splitting. In other words, one level in the BVH may be descended.

Because each thread may write back two entries, the size of the work queue may be confined to twice as large as a number of threads in a traversal block (e.g. group of rays) and may therefore be managed by parallel operations. All ray node/object node pairs that are to be intersected may be written back directly to a global memory for further processing and may or may not be to be stored locally. Once the ray groups are traversed through the object hierarchies from entry points, ray hit information may be updated. See operation 314. The ray hit information may include information corresponding to which rays or groups of rays, hit which objects or group of primitives.

Once the hit info is updated, it is determined whether more ray groups exist. See operation 316. If it is determined that more ray groups exist, the groups are then traversed through the object hierarchy.

If it is determined that no more ray groups exist, it is determined whether more objects exist. See operation 318. If more objects exist, a hierarchy is generated or loaded for an object and the process is repeated beginning with operation 308. This process may be repeated for a plurality of frames of data.

In one embodiment, a bounding box may be provided for each object in advance or generated for each object before the object hierarchy construction begins. In this case, the ray hierarchy may be quickly tested against the box to determine whether any intersection is possible. If an intersection is not possible, then construction of a BVH for that object may be omitted.

Additionally, when using pre-computed object hierarchies, a rigid transformation matrix may be stored such that the object is allowed to move without having to regenerate the hierarchy. It may also be possible to perform object hierarchy construction during ray hierarchy intersection. For example, if each ray group intersects with a different object in parallel, then each processor may perform construction systematically during the traversal.

It should be noted that a hierarchy for each object in a scene may be separated and intersected with a corresponding ray hierarchy. In one embodiment, the method 300 may be utilized in a streaming rendering context. In this case, the method 300 may be utilized as an addition to rasterization. For example, geometry or primitives generated at render time may be evaluated without global storage of a complete scene geometry.

Furthermore, the ray hierarchy may be built once per frame and the scene hierarchy may be built for small subsets of the scene geometry. As mentioned earlier, the combination of both hierarchies allows a streaming model for feeding the geometry into a ray tracer, while still maintaining ray tracing performance and maximum parallelism on a processor (e.g. a GPU). Traversing the hierarchies intersects both hierarchies in parallel, which a parallel processing architecture may perform with a work-queue approach, as described above.

Figure 4:
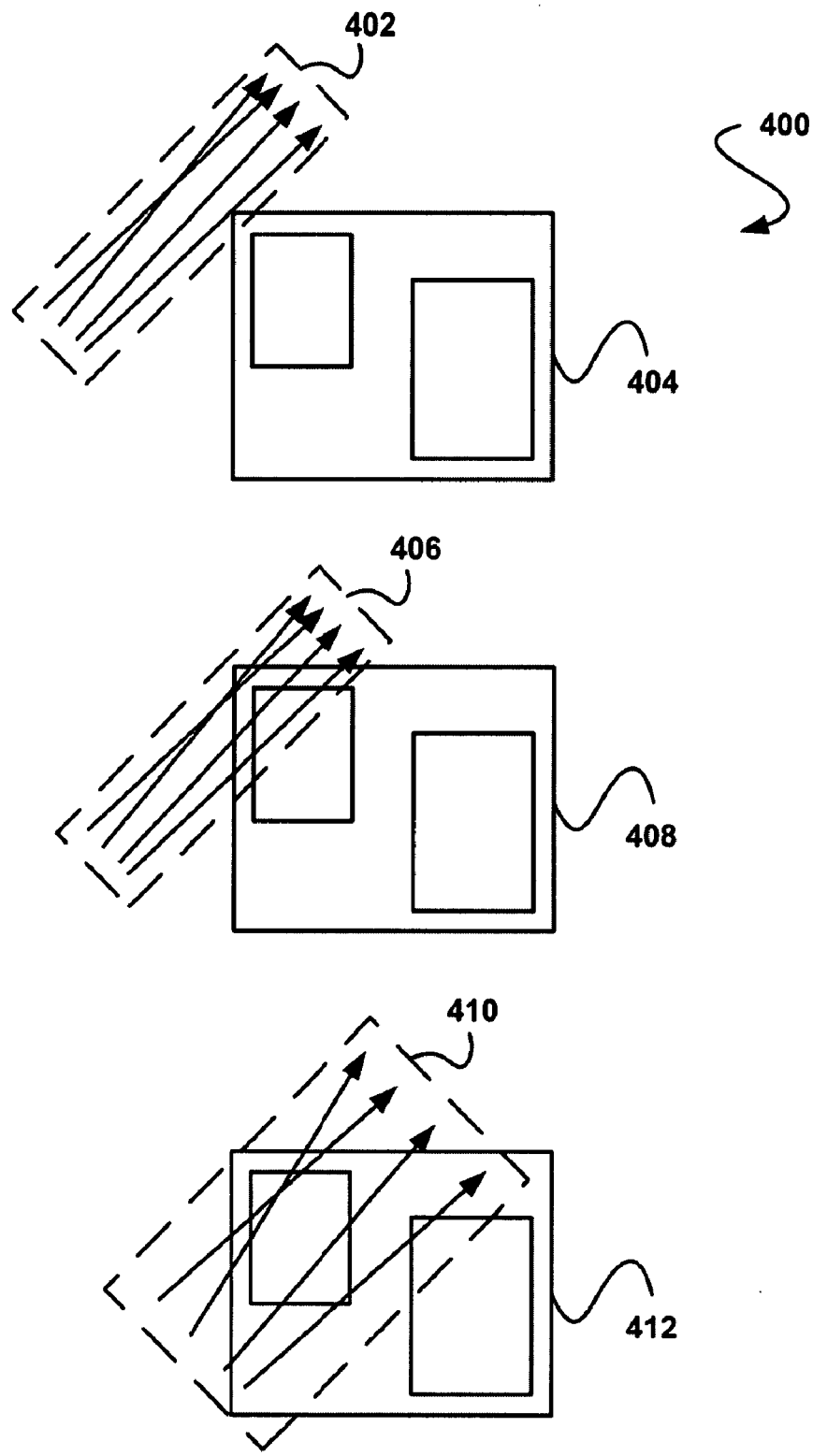
FIG. 4 shows three examples for an oriented bounding box intersection of objects, in accordance with one embodiment.

FIG. 4 shows three examples 400 for an oriented bounding box intersection of objects, in accordance with one embodiment. As an option, the examples 400 may be viewed in the context of the details of FIGS. 1-4. Of course, however, the examples 400 may be viewed in the context of any desired environment. It should also be noted that the aforementioned definitions may apply during the present description.

As shown, a first AABB of a first ray group 402 fails to intersect either child node of an object 404 in an object hierarchy. In this case, the object 404 may be excluded from further processing. Furthermore, no data would be written to a work queue as the first ray group 402 failed in intersect either child node of the object 404.

As shown further, a second AABB of a second ray group 406 intersects one child node of an object 408 in an object hierarchy. In this case, a level in the object hierarchy may be descended. In other words, additional splits, or nodes on a lower level in the object hierarchy may be evaluated for intersection.

As shown in a third example, a third AABB of a third ray group 410 intersects both child nodes of an object 412 in an object hierarchy. In this case, one level in a ray hierarchy may be descended. In other words, new splits, or nodes in the ray hierarchy may be evaluated for intersection. In one embodiment, the child nodes may represent subsets of objects in an object hierarchy. Thus, an intersection of the AABB may refer to any of the rays in the AABB intersecting the subset of the objects.

Figure 5:
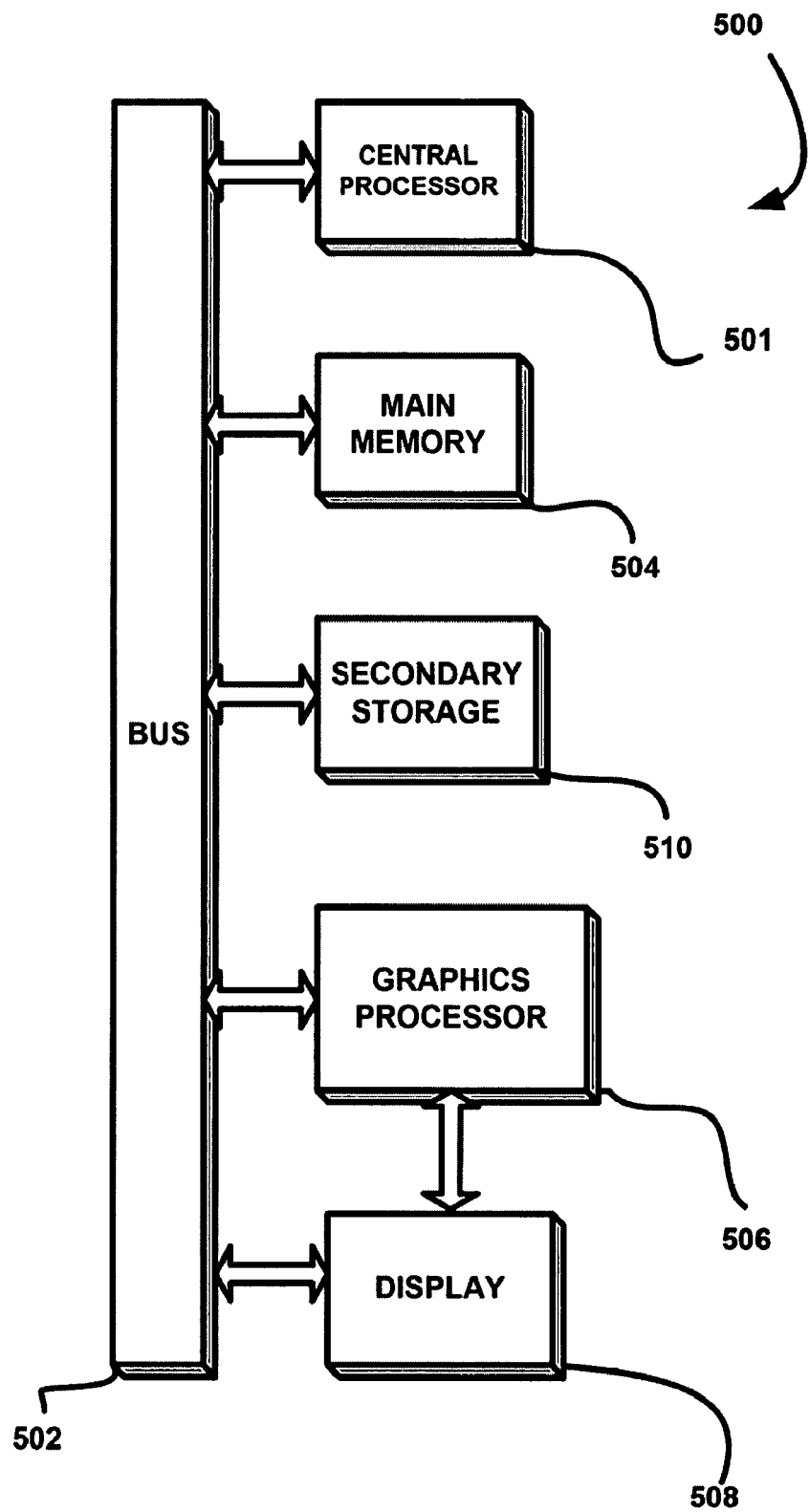
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. In one embodiment, the host processor 501 may represent a plurality of processors.

In this case, each of the processors may include a plurality of threads. As an option, each of the processors may run in parallel as a parallel processor architecture. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In one embodiment, the graphics processor 506 may represent a plurality of processors. In this case, each of the processors may include a plurality of threads. As an option, each of the processors may run in parallel as a parallel processor architecture.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
simultaneously traversing a hierarchy of rays and a hierarchy of objects; and ray tracing, utilizing at least one processor, based on the traversal;

wherein an optimized entry point in the hierarchy of objects is determined for each group of rays in the hierarchy of rays;

wherein each optimized entry point in the hierarchy of objects is determined utilizing one of a plurality of parallel entry point search algorithms that are run in parallel, where each parallel entry point search algorithm intersects a group of rays in the hierarchy of rays and the hierarchy of objects.

2. The method of claim 1, wherein the hierarchy of rays includes a plurality of rays to be evaluated.

3. The method of claim 2, wherein the hierarchy of rays is generated for each of the plurality of frames.

4. The method of claim 2, wherein the hierarchy of objects includes a subset of objects that are intersected by at least one of the rays.

5. The method of claim 1, wherein the hierarchy of rays is generated by organizing a plurality of rays.

6. The method of claim 5, wherein the rays are organized utilizing a bounding volume.

7. The method of claim 6, wherein the rays are organized utilizing a tree of bounding volumes.

8. The method of claim 6, wherein the bounding volume includes a convex bounding volume.

9. The method of claim 6, wherein the bounding volume includes an oriented bounding volume.

10. The method of claim 6, wherein the bounding volume includes an oriented bounding box.

11. The method of claim 6, wherein at least one aspect of the bounding volume is minimized.

12. The method of claim 11, wherein the at least one aspect of the bounding volume includes a surface area and a volume.

13. The method of claim 1, wherein ray tracing is performed utilizing a parallel processor architecture including a plurality of processors.

14. The method of claim 13, wherein the parallel processor architecture includes a graphics processor.

15. The method of claim 13, wherein each of the processors of the parallel processor architecture splits a corresponding group of rays.

16. The method of claim 15, wherein the corresponding group of rays is split based on criteria including at least one of an area, a volume, and a spatial median.

17. The method of claim 1, wherein each of the parallel entry point search algorithms outputs a list of groups of rays each with a corresponding object hierarchy node that is the optimized entry point of the group of rays.

18. The method of claim 1, wherein, for each group of rays in the hierarchy of rays, the group of rays is processed independently starting from the optimized entry point determined for the group of rays, and the ray tracing is implemented for all rays in the group of rays starting from the optimized entry point for the group of rays.

19. The method of claim 1, wherein, for each of the groups of rays, the optimized entry point in the hierarchy of objects includes a first node encountered in a top-down traversal of the hierarchy of objects for which both child nodes bounding volumes intersect a bounding box of the group of rays.

20. The method of claim 1, wherein the optimized entry point includes an optimal entry point.

21. The method of claim 1, wherein a number of entry points equal to a number of the plurality of parallel entry point search algorithms is found in the ray hierarchy by traversing levels of the ray hierarchy and assigning each of the group of rays a node pair as a starting point for the parallel entry point search algorithm associated with the group of rays.

22. The method of claim 21, wherein the node pair includes one of the entry points of the ray hierarchy and a root node of the object hierarchy.

23. The method of claim 21, wherein the node pair is written to a local work queue of node pairs that represent potential object bounding volume intersections to be performed by an associated processor.

24. A computer program product embodied on a non-transitory computer readable medium, comprising:

computer code for simultaneously traversing a hierarchy of rays and a hierarchy of objects, for performing ray tracing;

wherein the computer program product is operable such that an optimized entry point in the hierarchy of objects is determined for each group of rays in the hierarchy of rays;

wherein the computer program product is operable such that each optimized entry point in the hierarchy of objects is determined utilizing one of a plurality of parallel entry point search algorithms that are run in parallel, where each parallel entry point search algorithm intersects a group of rays in the hierarchy of rays and the hierarchy of objects.

25. An apparatus, comprising:

a parallel processor architecture for simultaneously traversing a hierarchy of rays and a hierarchy of objects, for performing ray tracing;

wherein the apparatus is operable such that an optimized entry point in the hierarchy of objects is determined for each group of rays in the hierarchy of rays;

wherein the apparatus is operable such that each optimized entry point in the hierarchy of objects is determined utilizing one of a plurality of parallel entry point search algorithms that are run in parallel, where each parallel entry point search algorithm intersects a group of rays in the hierarchy of rays and the hierarchy of objects.

26. The apparatus of claim 25, wherein the parallel processor architecture is in communication with memory via a bus.

* * * * *